J. BAILEY & G. MARSHALL.
Riding-Attachment for Plows.

No. 198,068.  Patented Dec. 11, 1877.

ATTEST:
Robert Burns.
Le Blond Burdett.

INVENTORS:
John Bailey
George Marshall
per Knight Bros
attys.

UNITED STATES PATENT OFFICE.

JOHN BAILEY AND GEORGE MARSHALL, OF BELLEVILLE, ILLINOIS.

IMPROVEMENT IN RIDING ATTACHMENTS FOR PLOWS.

Specification forming part of Letters Patent No. 198,068, dated December 11, 1877; application filed March 21, 1877.

*To all whom it may concern:*

Be it known that we, JOHN BAILEY and GEORGE MARSHALL, both of Belleville, in the county of St. Clair and State of Illinois, have made a new and useful Improvement in Riding Attachments for Plows, of which the following is a full, clear, and exact description, reference being had to the accompanying drawings, making part of this specification.

Our improvement relates to an attachment for an ordinary walking-plow to carry a driver's seat; and our invention consists in the combination, with the bar supporting the seat, of a lever, secured upon a stud constructed on the outer end of the same, and provided with an arm, carrying the spindle upon which the ground-wheel turns.

Our invention also consists in a vertically-adjustable arm, running from the seat-bar forward parallel with the beam of the plow, and whose front end gives bearing to a caster-wheel. The arm has adjustment by a lever having a segment-gear engaging an inside segment-rack upon the arm. This lever is easily moved by the driver while upon the seat, and thus the plow can be thrown out of the earth at the end of the furrow with perfect readiness.

Figure 1:
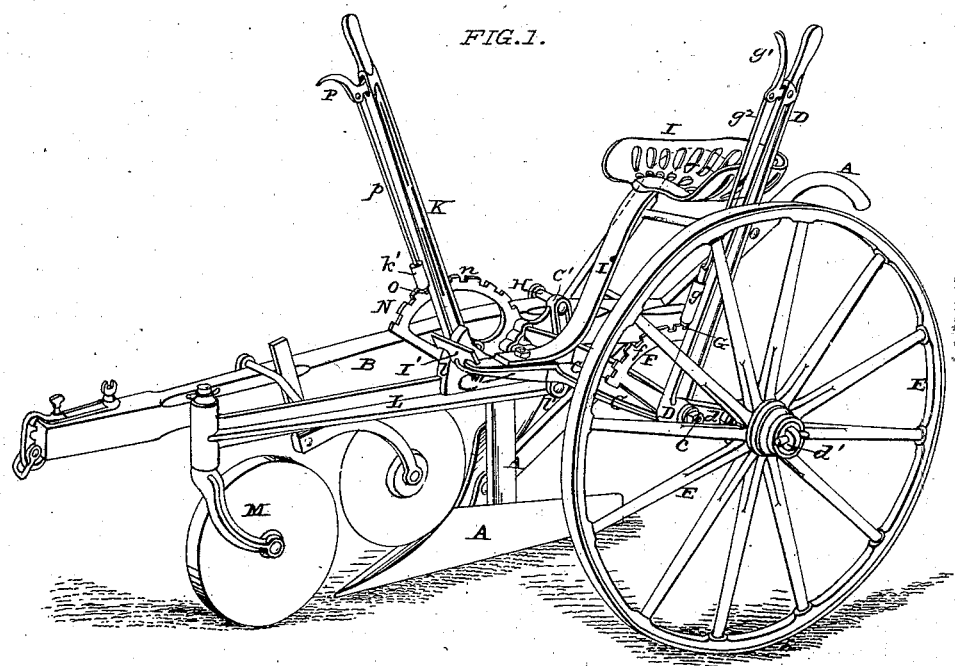
Figure 2:
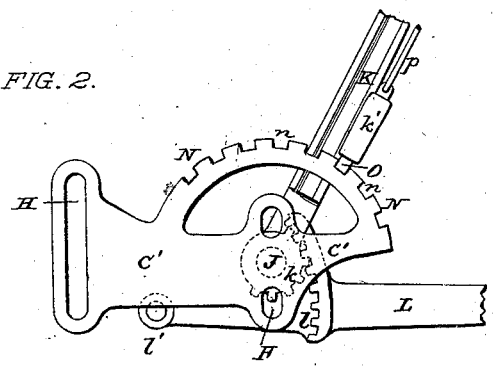

In the drawings, Figure 1 is a perspective view of the apparatus attached to a plow. Fig. 2 is a side view of the device for adjusting the caster-wheel arm enlarged.

A is an ordinary walking-plow, and B its beam. C is a horizontal bar projecting at a right angle from the beam. At the outer end of the bar C is a spindle, $c$, forming the fulcrum-bearing of the hand-lever D, which is of bell-crank form, and its shorter arm $d$ carries a spindle, $d'$, on which turns the ground-wheel E, that forms the support of the outer end of the bar C. F is a segment-rack, having square notches, $f$, to receive the spring-catch G of the lever D, so as to hold the lever in any position in which it may be placed.

The catch G is forced down by a spiral spring within the bearing-socket $g$, and is drawn up by a bell-crank hand-lever, $g^1$, through medium of a rod, $g^2$.

It will be seen that by movement of the lever D the bar C is raised or lowered at the outer end, so that the apparatus may be with great readiness arranged to any inclination of the ground, and the plow be made to run level, or at any desired inclination, by a simple movement of the lever D, under easy command of the driver upon the seat I.

$c'$ is a plate, constituting the inner end of the bar C, and said bar is connected to the beam by bolts H, above and beneath the beam, passing through the plate $c'$, and through cleat-plates at the other side of the beam.

The driver's seat I is supported on arm $C''$ of the bar C, as shown, and $I'$ is the driver's foot-rest.

J is a spindle projecting from the plate $c'$, and forming the fulcrum-bearing of the hand-lever K.

Upon the fulcrum-hub of the lever K is a cog-segment, $k$, engaging with an interior cog-segment, $l$, upon the arm L, in whose forward end the caster-wheel M has pivot-bearing.

The arm L is hinged, at its rear end $l'$, to the bottom of the bar C, so as to admit of the vertical adjustment of the wheel M to regulate the depth of the furrow. This adjustment is made by the lever K, by means of the gear $k\ l$, the lever being drawn back to lift the end of the arm.

N is a notched rack upon the plate $c'$, having in it square notches $n$, to receive the spring-catch O.

The catch O works in a bearing, $k'$, and is forced downward, to engage it in the notches $n$, by a spiral spring within said bearing. The catch O is lifted to disengage it from the notches $n$ by a rod, $p$, connecting it to a hand bell-crank lever, P, at the upper end of the lever K.

We claim—

1. In a one-wheel plow attachment, the cross-bar C, rigidly secured to the plow-beam by means of a broad bearing-plate, C', and constructed with an arm, $C''$, adapted to form a support for a seat and a foot-rest, and a stud or spindle, $c$, forming a bearing for a crank-lever, which carries the wheel, as and for the purpose set forth.

2. The lever K and arm L, attached to or near the bar C, in combination with the cog-segments $k$ and $l$, substantially as and for the purpose set forth.

3. The bar C, rigidly attached to the beam B, in combination with the wheel E, bell-crank lever D, spring-catch G, or equivalent, and notched quadrant or rack F, substantially as and for the purpose set forth.

JOHN BAILEY.
GEORGE MARSHALL.

Witnesses:
EMIL ABERER,
F. W. DEIDESHEIMER.